United States Patent [19]

Schaefer

[11] 3,884,385

[45] May 20, 1975

[54] APPARATUS FOR LOCKING END BELLS TO A SHELL OF AN ELECTRIC MOTOR

[75] Inventor: Edward J. Schaefer, Bluffton, Ind.

[73] Assignee: Franklin Electric Co., Inc., Bluffton, Ind.

[22] Filed: July 9, 1973

[21] Appl. No.: 377,215

[52] U.S. Cl. .................. 220/309; 220/3.8; 220/67; 310/89; 310/42
[51] Int. Cl. .......................................... B65d 41/12
[58] Field of Search .......... 310/40 MM, 42, 89, 91, 310/218, 254, 258; 220/59, 3.8, 67, 309

[56] References Cited
UNITED STATES PATENTS

| | | | |
|---|---|---|---|
| 1,270,758 | 1/1915 | Wilson | 220/59 |
| 1,514,930 | 11/1924 | Reynolds | 220/59 |
| 1,710,999 | 4/1929 | Schmid | 220/59 |
| 2,701,318 | 1/1955 | Feiertag | 310/89 |
| 3,313,968 | 4/1967 | Kaiser | 310/258 |
| 3,321,654 | 5/1967 | Allendorph | 310/258 |
| 3,450,907 | 6/1969 | Blume | 310/254 |
| 3,463,949 | 8/1969 | Stone | 310/258 |
| 3,567,973 | 3/1971 | Mastrodonato | 310/42 |
| 3,732,616 | 5/1973 | Mastrodonato | 310/89 |

*Primary Examiner*—R. Skudy
*Attorney, Agent, or Firm*—Hibben, Noyes & Bicknell

[57] ABSTRACT

This disclosure deals with a frame or housing for an electric motor including a stator and a rotor. The housing includes a tubular shell which encloses the stator and is secured thereto, and two end bells which support the rotor for rotation within the stator. The shell and the end bells are made of sheet metal. Axially extending notches are formed in the ends of the shell, and tabs at the outer peripheries of the end bells fit in the notches. Portions of the shell, adjacent the tabs, extend circumferentially over the tabs, thereby locking the shell and the end bells together.

2 Claims, 11 Drawing Figures

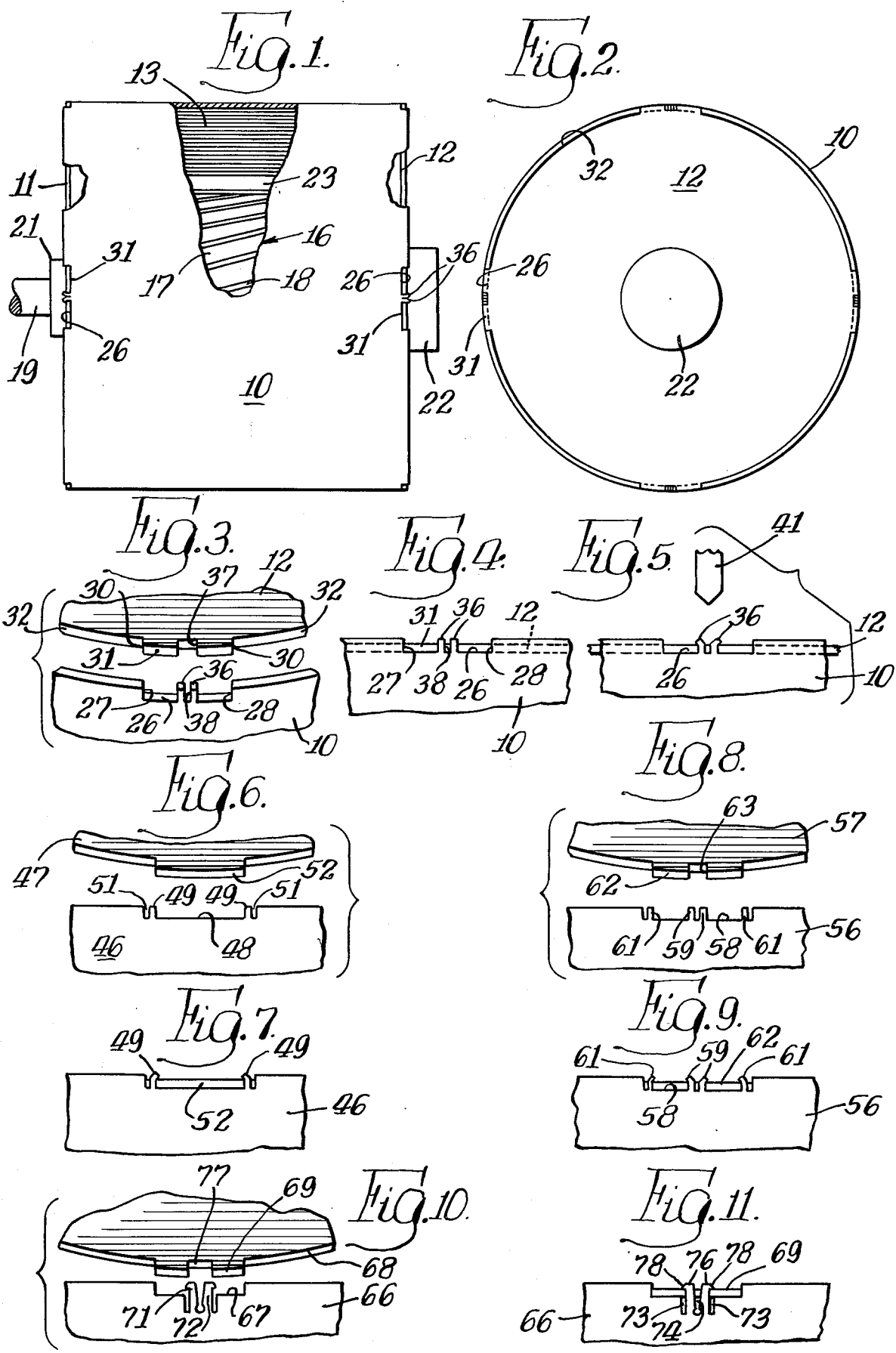

APPARATUS FOR LOCKING END BELLS TO A SHELL OF AN ELECTRIC MOTOR

One type of low-cost fractional horsepower motor includes a cylindrical outer shell to which the stator is attached, and an end bell at each end of the shell, the end bells being fastened to the shell and supporting the rotor of the motor. The cylindrical shell and the end bells are formed from sheet metal such as steel. Various fastening arrangements have been devised to secure the end bells to the shell, but such prior art fastening arrangements have been unsatisfactory for one reason or another. In some constructions, through bolts have been used, but such bolts, of course, add extra expense. Most types of fastening arrangements require accurate machining of surfaces of the shell and the end bells in order to obtain accurate alignment of the bearings and to obtain a uniform air gap, and again such machining is expensive. Some methods of construction require too many steps in the assembling process whereas still other methods do not sufficiently firmly hold the end bells to the shell. For example, the following listed U.S. patents disclose prior art structures: No. 3,289,018, No. 3,567,973, No. 3,450,907, No. 3,463,949, No. 2,701,318, No. 3,061,746, No. 3,707,037, No. 3,081,411, No. 2,944,169 and No. 3,321,654.

It is therefore a general object of the present invention to provide a novel and advantageous construction, and a method of fastening end bells to a cylindrical sheet metal shell of a motor. In accordance with the present invention, a housing for an electric motor is provided, comprising a cylindrical outer shell, a plurality of axially extending notches formed in at least one end of the shell, a disk-shaped end bell positioned at said one end of the shell, said end bell having radially extending locating tabs formed thereon and said locating tabs being positioned in said notches, and said shell having axially extending deformable holding tabs formed on said one end adjacent said locating tabs and said notches, said holding tabs extending circumferentially over at least a portion of said locating tabs and thus holding said end bell assembled with said shell.

Other features and advantages of the present invention will become apparent from the following detailed description taken in conjunction with the accompanying figures of the drawing, wherein:

FIG. 1 is a view of an electric motor including a housing embodying the invention, portions of the housing being broken away to show underlying parts of the motor;

FIG. 2 is an end view of the motor shown in FIG. 1;

FIG. 3 is a fragmentary enlarged exploded view of a portion of the motor housing shown in FIGS. 1 and 2;

FIG. 4 is a fragmentary view of the structure in FIG. 3 but in a different step in the process of manufacture;

FIG. 5 is a view similar to FIG. 4 but showing still another step in the process of manufacture;

FIGS. 6 and 7 are views respectively similar to FIGS. 3 and 5 but showing an alternate form of the invention;

FIGS. 8 and 9 are views similar to FIGS. 3 and 5 but illustrating still another alternate form of the invention; and FIGS. 10 and 11 are views similar to FIGS. 3 and 5 but illustrating still another alternate form of the invention.

The motor illustrated in FIGS. 1 and 2 includes a housing comprising a cylindrical shell 10 and two end bells 11 and 12. The motor further includes stator laminations 13 positioned within and rigidly secured to the cylindrical shell 10. The end bells 11 and 12 are positioned over the openings at the two ends of the shell 10 and are fastened to the shell 10 in a manner to be described hereinafter. The two end bells 11 and 12 rotatably support a rotor 16 including rotor laminations 17 secured to a rotor shaft 19. Windings 18 are carried by the laminations 17. Rotor bearings (not shown) are fastened to the two end bells 11 and 12 and are enclosed by bearing caps 21 and 22. The rotor is positioned within the stator cavity and is separated from the inner periphery of the stator laminations 13 by a uniform width air gap 23.

With reference to FIGS. 3 to 5, the end bells 11 and 12 are secured to the opposite end edges of the shell 10. A plurality of circumferentially spaced apart axially extending notches 26 are formed in each end of the shell, the notches 26 having axially extending side edges 27 and 28. In the present instance, four uniformly spaced notches 26 are formed in each end of the shell 10, but it should be understood that a lesser or greater number of such notches could be provided. Each end bell 11 and 12 has a plurality of radially extending locating tabs 31 formed thereon, one tab being provided for each notch. The circumferential length of each tab 31 is such that it fits snugly within the associated notch, and the side edges 30 of each tab 31 are perpendicular to the plane of the end bell. The diameter of each end bell, measured across the locating tabs 31, is substantially equal to the outer diameter of the shell 10 so that the outer edges of the tabs 31 are flush with the outer surface of the shell 10. Further, the diameter of each end bell, at the portions 31 between the tabs 10, is such as to fit snugly within the shell, as shown in FIG. 2. As shown in FIGS. 1, 4 and 5, the axial depth of the notches 26 is greater than the thickness of the sheet material used in making the end bells.

To hold the end bells 11 and 12 in tightly assembled relation with the shell 10, a plurality of deformable holding tabs 36 are formed on the shell 10. In the form of the invention illustrated in FIGS. 1 through 5, two holding tabs 36 are provided for each locating tab 31, the tabs 36 being formed approximately midway between the edges 27 and 28 of the notch 26. The outer ends of each pair of holding tabs 36 are substantially flush with the outer edge of the shell 10. A tab receiving slot 37 (FIG. 3) is formed in each locating tab 31, the slot 37 being located to receive the associated pair of holding tabs 36. Further, an axially extending slit 38 is formed in the shell 10 between each pair of holding tabs 36.

After the end bells 11 and 12 have been assembled with the shell 10 by positioning the locating tabs 31 in the notches 26 and holding tabs 36 in the slots 37, as shown in FIG. 4, a swedging or staking tool 41 is employed to deform or bend the holding tabs 36 of each pair circumferentially in opposite directions over the adjacent portions of the associated tab 31. Sufficient swedging pressure is applied to spread the outer ends of the holding tabs apart, so that the outer ends of the holding tabs 36 are deformed tightly against the adjacent portions of the locating tabs 31, thus holding the end bells securely assembled with the shell 10.

The shell 10 and the two end bells 11 and 12 are preferably made of sheet metal as previously mentioned, and the notches 26 and the slits 38 are preferably formed by a punching operation. Similarly, the circumfiguration of the end bells 11 and 12, including the formation of the tabs 31 and the slots 37 are preferably formed by punching operations. If necessary, the bottom edges of the notches 26 at each end of the shell may be machined so that they are in one plane perpendicular to the axis of the shell, to ensure that the end bells 11 and 12 will be properly located to align the bearings. The bottom edges of the notches of course prevent movement of the end bells toward each other while the deformed holding tabs 36 prevent movement in the opposite direction. The locating tabs 31 in the notches 26 prevent circumferential movement of the end bells while the tight fit between the edges 32 of the end bells and the inner periphery of the shell 10 prevent radial movement of the end bells. Even though the end bells and the shell are securely fastened together, they may be disassembled for servicing if necessary by bending the holding tabs 36 circumferentially toward each other. Also, if desired, when assembling the end bells with the shell, first one of each pair of the holding tabs 36 may be deformed, and then the parts be checked for proper alignment. If the assembly appears to be accurate, the second of the two holding tabs 36 may then be deformed. The construction has another advantage in that the deformed tabs 36 will always be pressed tightly against the locating tabs regardless of any variations in the thickness of the sheet material used in making the end bells.

FIGS. 6 and 7 illustrate an alternate form of construction wherein the holding tabs are formed at the outer ends of notches in the shell rather than at the centers of the notches. This construction includes a shell 46 and two end bells, only one end bell 47 being illustrated. A plurality of notches 48 are formed in each end of the shell 46, the notches 48 extending axially from the outer end of the shell, and a pair of holding tabs 49 are formed on the shell adjacent the ends of each notch 48. The holding tabs 49 may be formed by slits 51 punched in the shell 46. The end bell 47 includes a locating tab 52 which is sized to extend into the notch 48 between the two tabs 49. The remainder of the motor construction may be similar to that of the earlier described embodiment.

During assembly, the end bell 47 is moved into the shell 46, the tab 52 being located in the notch 48 as shown in FIG. 7, and then a swedging or staking tool is employed to deform the holding tabs 49 circumferentially toward each other, and over the adjacent portions of the locating tab 52 in order to secure the parts together.

The form of the invention illustrated in FIGS. 8 and 9 is the combination of the two forms previously described. This form of the invention includes a shell 56 and an end bell 57. An axially extending notch 58 is formed in an end of the shell 56, and holding tabs 59 are formed at the center of the notch 58. Additional holding tabs 61 are formed at the outer ends of the notch 58. The end bell 57 has a locating tab 62 formed thereon which is sized to fit between the holding tabs 61. Further, a slot 63 is formed in the tab 62, which receives the two holding tabs 59.

The end bell 57 is assembled with the shell 56 by moving the shell and the end bell together to place the tab 62 in the notch 58. The tabs 61 are deformed circumferentially toward each other, and the tabs 59 are deformed circumferentially away from each other. It will be apparent that the FIG. 8 form of the invention has greater holding power than the other two forms described because there are twice as many holding tabs. As previously mentioned, during preliminary assembly of the end bell with the shell, less than all of the holding tabs may be initially deformed, and then the remaining holding tabs may be deformed after the assembly has been checked for accuracy.

The form of the motor illustrated in FIGS. 10 and 11 includes spring tabs rather than permanently deformable tabs as in the above described forms of the invention, and is particularly useful where ease of assembly and disassembly is desired. This form includes a cylindrical shell 66 having an axially extending notch 67 formed therein, and an end bell 68 having a radially extending locating tab 69 thereon. Two spring-like holding tabs 71 and 72 are formed on the shell 66 at approximately the center of the notch 67, the shell 66 having elongated slits 73 formed on opposite sides of the tabs 71 and 72 and an elongated slit 74 formed between them. The slits 73 and 74 have a greater axial length than the notch 67 and are long enough to enable the tabs 71 and 72 to flex, and the inner end of the slit 74 is preferably enlarged and rounded.

The outer ends of the two tabs 71 and 72 have hook-shaped portions 76 formed thereon, and the locating tab 69 has a slot 77 formed therethrough, which is located to receive the two tabs 71 and 72.

To assemble the end bell 68 with the shell 66, the outer ends of the two tabs 71 and 72 are squeezed or deformed toward each other to permit the two tabs 71 and 72 to pass through the slot 77. After the tab 69 has seated on the bottom of the slot 67, the two tabs 71 and 72 spring back to their original shape where the hook-shaped portions 76 extend over the adjacent edges of the tab 69 and lock the parts together. The outer surfaces 78 (FIG. 11) of the hook portions 76 are preferably slanted so that the two tabs 71 and 72 will be deformed or cammed together by the edges of the slot 77 during assembly, until the tab 69 passes the hook-shaped portions 76 at which time the tabs 71 and 72 spring circumferentially outwardly and lock the parts together. If desired, a tool may be provided to squeeze the tabs together during assembly.

It will be obvious from the foregoing that a novel and advantageous motor frame and method of assembly has been provided. The parts may be securely locked together with the end bells accurately aligned relative to each other and to the shell, and nevertheless the parts may be disassembled if necessary. The construction is advantageous in that it is both inexpensive and produces excellent results. One or both end bells of a motor may be constructed and assembled as described.

I claim:

1. A housing for an electric motor, comprising a cylindrical shell, a plurality of axially extending notches formed in at least one end of said shell, an end bell having a plurality of radially extending locating tabs formed thereon, said end bell being positioned over said one end of said shell with each of said locating tabs being positioned in one of said notches, and said shell further having at least two deformable preformed holding tabs formed thereon adjacent said locating tabs, said holding tabs extending in opposite circumferential directions over said locating tabs and thereby locking said shell and said end bell in assembled relation and holding said end bell against circumferential movement relative to said shell, said holding tabs being formed at approximately the center of said notches, and said locating tabs having slots for receiving said holding tabs.

2. A housing for an electric motor, comprising a cylindrical shell, a plurality of axially extending notches formed in at least one end of said shell, an end bell having a plurality of radially extending locating tabs formed thereon, said end bell being positioned over said one end of said shell with each of said locating tabs being positioned in one of said notches, and said shell further having at least two deformable preformed holding tabs formed thereon adjacent said locating tabs, said holding tabs extending in opposite circumferential directions over said locating tabs and thereby locking said shell and said end bell in assembled relation and holding said end bell against circumferential movement relative to said shell, and said holding tabs including first holding tabs formed on said shell at the outer ends of said notches, and second holding tabs formed on said shell at approximately the center of said notches.

* * * * *